(12) United States Patent
Kurapati et al.

(10) Patent No.: US 8,707,419 B2
(45) Date of Patent: Apr. 22, 2014

(54) SYSTEM, METHOD AND APPARATUS FOR PROTECTING A NETWORK OR DEVICE AGAINST HIGH VOLUME ATTACKS

(75) Inventors: Srikrishna Kurapati, Richardson, TX (US); Sachin Purushottam Joglekar, Dallas, TX (US); Krishna Sobhan Bhaskar Kokkiligadda, Hyderabad (IN); Mukesh Kumar Singh, Hyderabad (IN); Samrat Saha, West Bengal (IN)

(73) Assignee: Avaya Inc., Basking Ridge, NJ (US)

( * ) Notice: Subject to any disclaimer, the term of this patent is extended or adjusted under 35 U.S.C. 154(b) by 1137 days.

(21) Appl. No.: 11/769,609

(22) Filed: Jun. 27, 2007

(65) Prior Publication Data

US 2009/0144820 A1 Jun. 4, 2009

Related U.S. Application Data

(60) Provisional application No. 60/817,445, filed on Jun. 29, 2006.

(51) Int. Cl.
*G06F 9/00* (2006.01)

(52) U.S. Cl.
USPC .......................................................... 726/13

(58) Field of Classification Search
USPC .......................................................... 726/23
See application file for complete search history.

(56) References Cited

U.S. PATENT DOCUMENTS

| | | | |
|---|---|---|---|
| 5,581,610 A * | 12/1996 | Hooshiari | ............... 379/133 |
| 6,137,782 A | 10/2000 | Sharon et al. | |
| 6,363,065 B1 | 3/2002 | Thornton et al. | |
| 6,498,791 B2 | 12/2002 | Pickett et al. | |
| 6,598,183 B1 | 7/2003 | Grieco et al. | |
| 6,665,293 B2 | 12/2003 | Thornton et al. | |
| 6,757,823 B1 | 6/2004 | Rao et al. | |
| 6,769,016 B2 | 7/2004 | Rothwell et al. | |
| 6,781,955 B2 | 8/2004 | Leung | |
| 6,791,955 B1 | 9/2004 | Kikuchi et al. | |
| 6,816,455 B2 | 11/2004 | Goldberg et al. | |
| 6,842,449 B2 | 1/2005 | Hardjono | |
| 7,046,680 B1 | 5/2006 | McDysan et al. | |
| 7,380,011 B2 | 5/2008 | Li et al. | |
| 7,385,957 B2 | 6/2008 | O'Neill | |
| 7,508,767 B2 | 3/2009 | Shinomiya | |
| 7,681,101 B2 | 3/2010 | Oran et al. | |

(Continued)

OTHER PUBLICATIONS

Stein, L. D. and Stewart, J. N., "The World Wide Web Security FAQ, Version 3.1.2, Feb. 4, 2002," http://www.w3.org/Security/Faq/.

(Continued)

*Primary Examiner* — Philip Chea
*Assistant Examiner* — Daniel Hoang
(74) *Attorney, Agent, or Firm* — Sheridan Ross P.C.

(57) ABSTRACT

The present invention provides a system, method and apparatus for protecting against high volume attacks. The present invention receives a packet, determines a source of the received packet, and updates a tree-based data structure based on the source of the received packet. The received packet is accepted or passed on whenever one or more statistics stored within the tree-based data structure do not exceed a threshold. The received packet is dropped whenever the one or more statistics exceed the threshold. The present invention can be implemented in hardware, software or a combination thereof. The software will implement the steps as one or more code segments of a computer program embodied on a computer readable medium.

26 Claims, 9 Drawing Sheets

(56) References Cited

U.S. PATENT DOCUMENTS

| | | | |
|---|---|---|---|
| 7,720,462 B2 | 5/2010 | Chu | |
| 8,027,251 B2 | 9/2011 | Ormazabal et al. | |
| 8,341,724 B1 | 12/2012 | Burns et al. | |
| 2002/0099854 A1 | 7/2002 | Jorgensen | |
| 2002/0129236 A1 | 9/2002 | Nuutinen | |
| 2003/0009699 A1 | 1/2003 | Gupta et al. | |
| 2003/0110286 A1 | 6/2003 | Antal et al. | |
| 2004/0042470 A1* | 3/2004 | Cooper et al. | 370/401 |
| 2004/0083299 A1 | 4/2004 | Dietz et al. | |
| 2004/0086093 A1 | 5/2004 | Schranz | |
| 2004/0161086 A1 | 8/2004 | Buntin et al. | |
| 2004/0203799 A1 | 10/2004 | Siegel | |
| 2004/0260560 A1 | 12/2004 | Holloway et al. | |
| 2005/0132060 A1 | 6/2005 | Mo et al. | |
| 2005/0201363 A1 | 9/2005 | Gilchrist et al. | |
| 2005/0232193 A1 | 10/2005 | Jorgensen | |
| 2005/0249214 A1* | 11/2005 | Peng | 370/392 |
| 2005/0259667 A1 | 11/2005 | Vinokurov et al. | |
| 2006/0028980 A1 | 2/2006 | Wright | |
| 2006/0036727 A1 | 2/2006 | Kurapati et al. | |
| 2006/0288411 A1 | 12/2006 | Garg et al. | |
| 2007/0076853 A1 | 4/2007 | Kurapati et al. | |
| 2007/0121596 A1 | 5/2007 | Kurapati et al. | |
| 2007/0204060 A1* | 8/2007 | Higuchi et al. | 709/234 |
| 2007/0271613 A1* | 11/2007 | Joyce | 726/23 |
| 2008/0016334 A1 | 1/2008 | Kurapati et al. | |
| 2008/0016515 A1 | 1/2008 | Naim et al. | |
| 2008/0229382 A1 | 9/2008 | Vitalos | |
| 2009/0094671 A1 | 4/2009 | Kurapati et al. | |
| 2011/0173697 A1 | 7/2011 | Kurapati et al. | |

OTHER PUBLICATIONS

Tyson, Jeff and Valdes, Robert, "How VoIP Works" http://computer.howstuffworks.com/ip-telephony.htm.

US Congress, CAN-SPAM Act of 2003, http://www.spamlaws.com/federal/108s877.shtml.

International Search Report and Written Opinion of the International Searching Authority for PCT/US2006/035903 dated Apr. 23, 2007.

International Search Report and Written Opinion of the International Searching Authority for PCT/US2006/031499 dated May 24, 2007.

AT&T Natural Voices at www.naturalvoices.att.com/, Sep. 13, 2005, accessed through www.archive.org on Jul. 9, 2007, 1 page.

Bell Labs Text-to-Speech Synthesis, Lucent Technologies, www.bell-labs.com/project/tts/voices.html; Sep. 11, 2005; accessed through www.archive.org on Jul. 9, 2007, 2 pages.

Data Compression Download Source Code and Papers at www.data-compression.com/download.shtml, accessed May 2005, 3 pages.

Data Compression—Speech—Commercial Libraries, Visicron www.datacompression.info/Speech.shtml, 2005, 12 pages.

Digital Libraries Initiative Phase 2, at www.dli2.nsf.gov, Nov. 28, 2003, 2 pages.

Hidden Markov Model Toolkit, www.htk.eng.cam.ac.ukf, Sep. 9, 2005, 4 pages.

ITU-T.Recommendation G.191, Software Tool Library 2000 User's Manual. ITU, Geneva, Dec. 2000, 193 pages.

ITU-T. Recommendation G. 711, Pulse code molulation (PCM) of voice frequencies, vol. Fascicle 111.4 of Blue Book, pp. 175-184, ITU, Geneva, 1989, 12 pages.

ITU-T. Recommendation G.729, Coding of Speech at 8 kbps using Conjugate-Structure Algebraic-Code-Excited Linear-Prediction (CS-ACELP). ITU, Geneva, Mar. 1996, 39 pages.

Microsoft Text-to-Speech Package at ww.microsoft.com/reader/developers/downloads/tts.asp; Sep. 8, 2005; accessed through www.archive.org on Jul. 9, 2007, 2 pages.

New Podcast-CounterHegemony Podcast, at www.ipodder.org/, Sep. 4, 2005; accessed through www.archive.org on Jul. 9, 2007, 8 pages.

Speech Compression, wvvw.data-compression.com/speech.shtml, accessed May 2005, 13 pages.

International Search Report and Written Opinion for PCT/US2007/073290 dated Apr. 15, 2008, 9 pages.

International Search Report and Written Opinion for PCT/US2007/073298 dated Aug. 21, 2008, 11 pages.

Official Action for U.S. Appl. No. 12/189,151, mailed Dec. 29, 2011.

Final Action for U.S. Appl. No. 12/189,151, mailed Jan. 4, 2013, 22 pages.

International Search Report and Written Opinion for PCT/US2007/014871 dated Sep. 11, 2008.

* cited by examiner

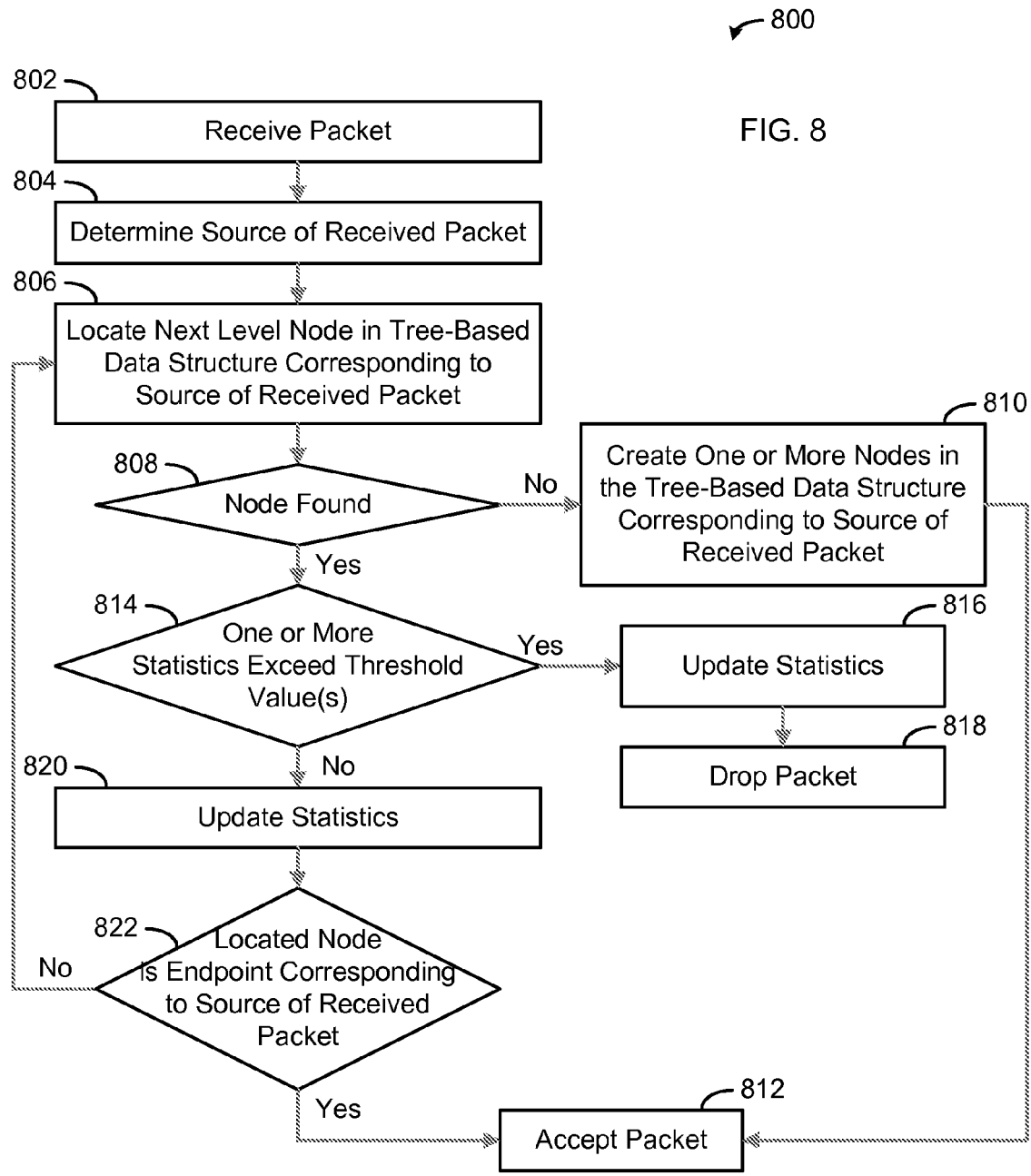

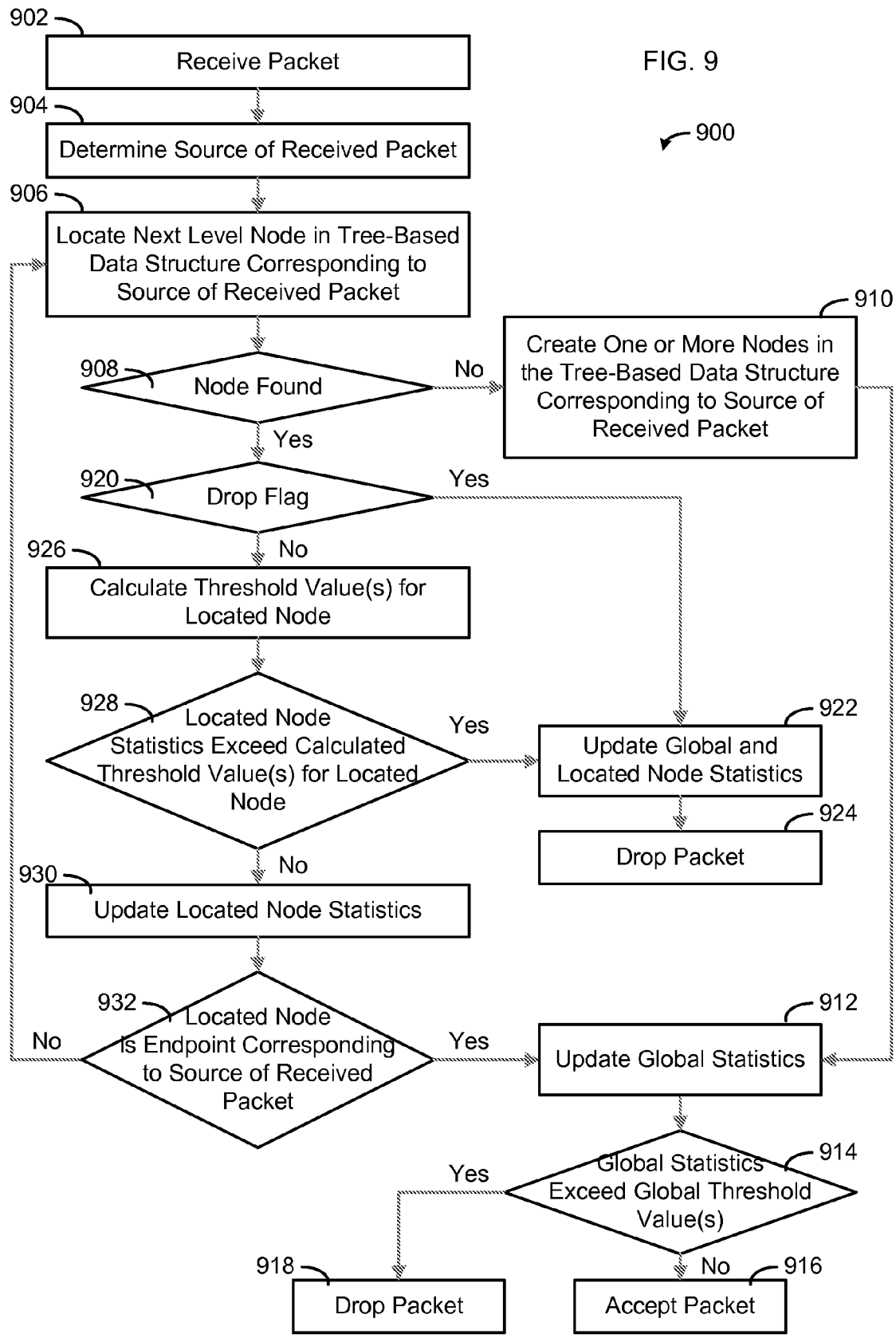

SYSTEM, METHOD AND APPARATUS FOR PROTECTING A NETWORK OR DEVICE AGAINST HIGH VOLUME ATTACKS

PRIORITY CLAIM TO RELATED APPLICATIONS

This patent application is a non-provisional application of U.S. provisional patent application 60/817,445 filed on Jun. 29, 2006 and entitled "System, Method and Apparatus for Protecting a Network or Device Against High Volume Attacks" which is hereby incorporated by reference in its entirety.

FIELD OF THE INVENTION

The present invention relates generally to the field of communications and, more particularly, to a system, method and apparatus for protecting a network or device against high volume attacks.

BACKGROUND OF THE INVENTION

During a denial of service (DOS) or distributed denial of service (DDOS) attack the volume of attack may be close to the link capacity. The number of attacking sources can be too many and may change too fast. The challenge is to make sure that a secured device never gets more traffic than it can handle.

A traditional way to solve the above problem is to use blind rate limiting. But rate limiting does not solve the problem completely. It protects the server from getting overwhelmed but it does not allow the genuine sources to get service during attack. It leads to a DOS on the sources.

There comes the need for source limiting and with it a lot more challenges. Since the sources can be too many and may change too fast, a fast and memory efficient way of managing the source statistics is required to keep track of the attacking endpoints dynamically at link speed. Accordingly, there is a need for a system, method and apparatus for protecting a network or device against high volume attacks.

SUMMARY OF THE INVENTION

The present invention provides an innovative source limiting solution to protect against high volume DOS/DDOS attacks against any network or networked device at a link speed, substantially at the link speed or near the link speed. An algorithm and related data structures are proposed for source limiting that achieve superior performance by managing memory and CPU requirements efficiently. The present invention can be deployed to protect a network or device if the communication protocol embeds source (endpoint) related information into the packet. The data structure described herein is not limited to source limiting or Voice over Internet Protocol (VOIP) applications; it can be used for any fast and memory efficient statistics maintenance that requires aggregation based on a common key prefix.

More specifically, the present invention provides a method for protecting against high volume attacks by receiving a packet, determining a source of the received packet, and updating a tree-based data structure based on the source of the received packet. The received packet is accepted or passed on whenever one or more statistics stored within the tree-based data structure do not exceed a threshold. The received packet is dropped whenever the one or more statistics exceed the threshold. The method can be implemented in hardware, software or a combination thereof. The software will implement the steps as one or more code segments of a computer program embodied on a computer readable medium.

In addition, the present invention provides an apparatus for protecting against high volume attacks that includes a first and second communications interface, and a processor communicably coupled to the first and second communications interfaces. The processor determines a source of a packet received at the first communications interface, updates a tree-based data structure based on the source of the received packet, passes the received packet to the second communications interface whenever one or more statistics stored within the tree-based data structure do not exceed a threshold, and drops the received packet whenever the one or more statistics exceed the threshold.

Moreover, the present invention provides a system for protecting against high volume attacks that includes a first network, a first communications interface communicably coupled to the first network, a second network or destination device, a second communication interface communicably coupled to the second network, and a processor communicably coupled to the first and second communications interfaces. The processor determines a source of a packet received at the first communications interface, updates a tree-based data structure based on the source of the received packet, passes the received packet to the second communications interface whenever one or more statistics stored within the tree-based data structure do not exceed a threshold, and drops the received packet whenever the one or more statistics exceed the threshold.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 8 is a flow chart of a method of protecting a network or device in accordance with another embodiment of the present invention;

FIG. 9 is a flow chart of a method of protecting a network or device in accordance with another embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to the processing of packet-based communications, but it will be understood that the concepts of the present invention are applicable to any fast and memory efficient statistics maintenance that requires aggregation based on a common key prefix.

The present invention provides an innovative source limiting solution to protect against high volume DOS/DDOS attacks against any network or networked device at a link speed, substantially at the link speed or near the link speed. An algorithm and related data structures are proposed for source limiting that achieve superior performance by managing memory and CPU requirements efficiently. The present invention can be deployed to protect a network or device if the communication protocol embeds source (endpoint) related information into the packet. The data structure described herein is not limited to source limiting or Voice over Internet Protocol (VOIP) applications; it can be used for any fast and memory efficient statistics maintenance that requires aggregation based on a common key prefix.

In addition, the present invention can use the following features to manage data structures and source statistics:

Self Managing: The data structure itself manages the memory and CPU requirements by piggybacking the control messages with the packet processing path. This innovative way enables the present invention to manage source statistics at link speed.

Self Feedback: The present invention becomes self aware and modifies the trust index accordingly if some sources are crossing a threshold(s). The present invention automatically blocks an attacker that keeps flooding the network or device.

Intelligent: The present invention automatically switches to a less granular aggregated level of protection when the attack volume increases.

Fairness enforcer: The present invention makes sure all the well behaved sources (endpoints) are served fairly during the attack.

Application Feedback: The present invention allows for feedback from the application about the behavior of the source (endpoint) by modifying the trust index of the endpoint.

Figure 1:
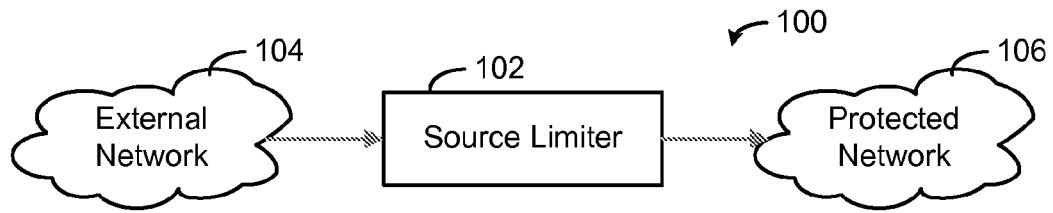
FIG. 1 is a block diagram of a system/apparatus in accordance with one embodiment of the present invention.

Now referring to FIG. 1, a block diagram of a system/apparatus 100 in accordance with one embodiment of the present invention is shown. The system 100 includes an apparatus (source limiter) 102 communicably coupled to a first network (external network) 104 and a second network or device (protected network or device) 106. The source limiter 102 includes a first communications interface communicably coupled to the first network 104, a second communication interface communicably coupled to the second network or device 106 and one or more processors communicably coupled to the first and second communications interfaces. The one or more processors determine a source of a packet received at the first communications interface, updates a tree-based data structure based on the source of the received packet, passes the received packet to the second communications interface for transmission to the second network or device 106 whenever one or more statistics stored within the tree-based data structure do not exceed a threshold, and drops the received packet whenever the one or more statistics exceed the threshold. The packet processing can be performed at a link speed, substantially at the link speed or near the link speed using hardware, software or a combination thereof. For example, a hardware implementation having a bit matching engine can be used so that a mask field is not required at each node within the tree-based data structure. Note that the present invention can be implemented in the "System and Method for Providing Network Level and Nodal Level Vulnerability Protection in VoIP Networks" described in U.S. Patent Publication No. US-2007-01215960A1 published on May 31, 2007, which is incorporated herein in its entirety.

Figure 2:
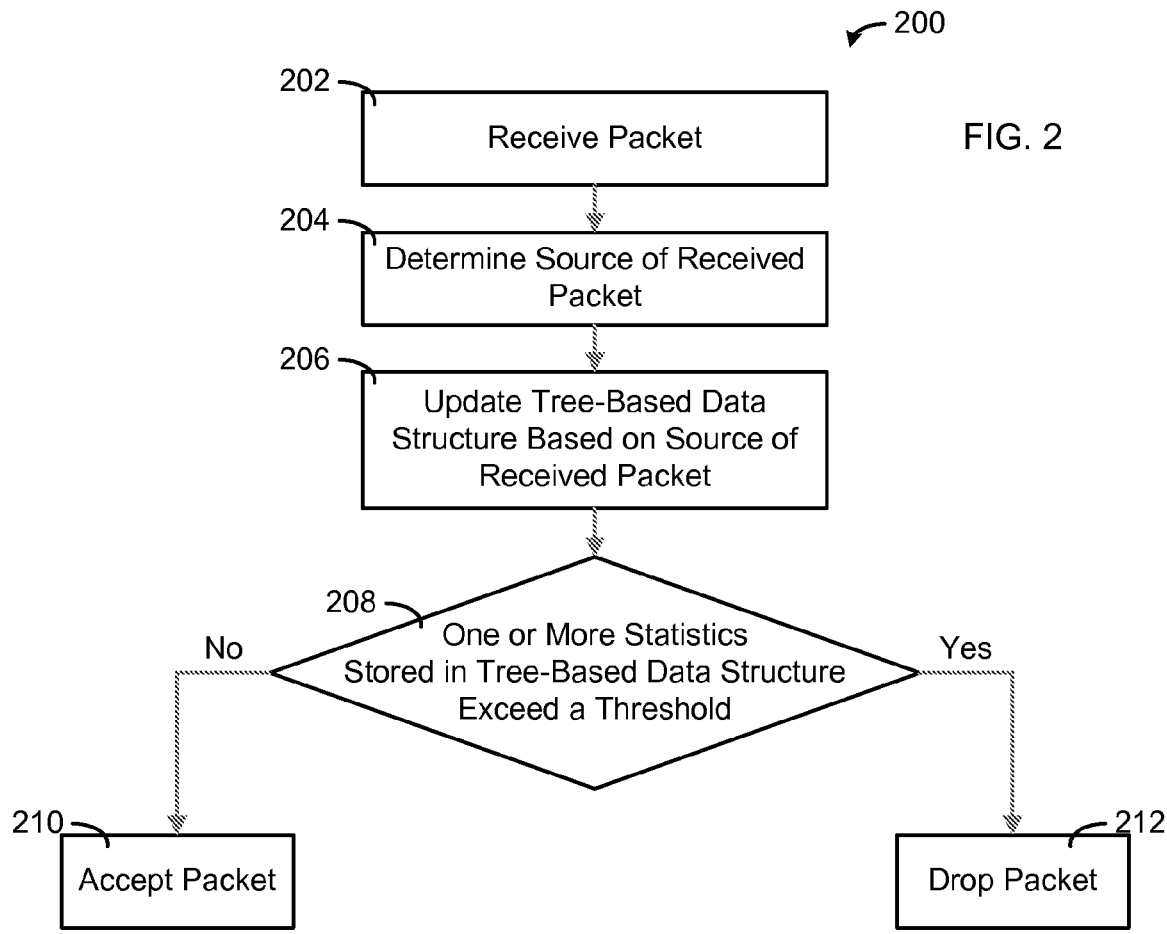
FIG. 2 is a flow chart of a method of protecting a network or device in accordance with one embodiment of the present invention.

Referring now to FIG. 2, a flow chart of a method 200 of protecting a network or device in accordance with one embodiment of the present invention is shown. A packet is received in block 202 and a source of the received packet is determined in block 204. A tree-based data structure is updated based on the source of the received packet in block 206. If one or more statistics stored within the tree-based data structure do not exceed a threshold, as determined in decision block 208, the received packet is accepted or passed in block 210. If, however, the one or more statistics stored within the tree-based data structure exceed the threshold, as determined in decision block 208, the received packet is dropped in block 212. The method 200 can be implemented in hardware, software or a combination thereof. The software will implement the steps as one or more code segments of a computer program embodied on a computer readable medium.

The updating process 206 may also include updating the one or more statistics, determining the threshold, determining a new traffic rate at a node and resetting one or more counters, creating one or more nodes within the tree-based data structure corresponding to the source of the received packet, deleting one or more nodes within the tree-based data structure after a specified time period with no activity, automatically adjusting the threshold based on a packet volume, or reserving a bandwidth for one or more trusted sources. The one or more statistics are stored within the tree-based data structure based on a pattern key that uniquely identifies the source of the received packet. For example, the pattern key can be derived from an Internet Protocol address of the source of the received packet. The one or more statistics may include one or more global statistics, one or more node statistics, a traffic rate, a maximum delay, a maximum number of sources in a time period, a minimum number of allowed messages from a source within the time period, a maximum number or allowed messages from the source within the time period, an endpoint count, a cumulative packet count, a cumulative traffic rate, a trust index, a drop flag, or a combination thereof. As a result, the one or more statistics can be maintained for an individual source and at an aggregated level.

The present invention uses the following tunable global parameters in the source limiting algorithm:

Traffic Rate allowed passing through the Source Limiter (R) that the application can handle.

Weight for the old traffic rate while calculating the new traffic rate ($\alpha$). This is an indicator of how much of history is remembered.

The maximum delay that can be introduced to a packet ($\delta$). This enforces requirement on application's minimum buffering capacity.

Snapshot Period over which the source stats should be spooled (T).

Maximum allowed sources in a snapshot period (N).

Minimum number of allowed messages from a single source within a snapshot before declaring it flooding (min_no_msg).

Maximum number of allowed messages from a single source within a snapshot before declaring it flooding (max_no_msg).

Endpoint count in the present snapshot (n).

Cumulative packet count (c).

Cumulative traffic rate (r). The new rate is calculated at each refresh using the formula: New rate=$(c/\delta)*\alpha+(1-\alpha)*$ Past rate.

Effective max traffic rate per endpoint: $R''=(R*T)/\Sigma\lambda_i$ where i=1 to n, the max traffic rate for ith endpoint is $\lambda_i*R''$ where $\lambda_i$ is the trust index of ith endpoint. The effective traffic rate is not per second; it is per snapshot period (T).

Global threshold=$(R-r)*\delta+R$ where r<=R.

The present invention uses a tree-based data structure with innovative operations on the tree data structure. Each node of the tree contains the following data:

Common Pattern Length—Length of the common pattern.

Common Pattern that this node represents. Each node below this node has this common prefix Common Pattern Mask—The mask value when ANDed with the source key result in common pattern (if it matches). This field is included for fast bit matching.

Drop Flag—A flag signifying that any packet traversing this node should be right away dropped.

Refresh Flag—A flag signifying that this node needs to be refreshed and counters should be reset. This is used for tree pruning also.

Actual Aggregation Count—This number tells how many sources are represented by this node. In other words how many sources are in the current snapshot with the common prefix represented by this node.

Outstanding Aggregation Count—This number tells how many sources have been added below this node that has not been communicated to the ancestor nodes.

Packet Count—Number of packets that has traversed this node in this snapshot.

Drop Count—Number of packets dropped at or below this node in this snapshot.

Node Traffic Rate—The average traffic rate at this node.

Node Trust Index—This number signifies behavior of the traffic traversing this node. A trust index of value one signifies well behaved traffic and a value less than one signifies misbehaving traffic.

The data structure is used to representing a node of the tree:

```
struct node_data {
    UCHAR       pattern_length;
    UCHAR       pattern[MAX_KEY_LENGTH];
    UCHAR       mask [MAX_KEY_LENGTH];
    UCHAR       drop_flag;
    UINT        drop_count;
    UCHAR       refresh_flag;
    INT         act_agr_count;
    INT         outs_agr_count;
    UINT        packet_count;
    UINT        traffic_rate;
    UINT        trust_index;
    struct node *child_node[MAX_NO_CHILD];
} node_data;
```

MAX_KEY_LENGTH:—length of the Key in number of bytes on which Source Limiting is based. For IP:URI as Key MAX_KEY_LENGTH=4+2=6 bytes.

MAX_NO_CHILD:—maximum number of child any node can have (when 2 bits are getting viewed then MAX_NO_CHILD=$2^2$=4).

The present invention also performs the following operations on the tree-based data structure:

update_tree—traverses the Source Limiter Tree and adds the new node for the endpoint if it was not already in the tree. It also makes sure that thresholds at each node is not getting crossed and returns the DROP or ACCEPT verdict. It also internally handles the tree pruning based on refresh flag at each node.

refresh_node—calculates the new traffic rate at the node and resets the counters.

force_refresh—prunes the tree forcibly to make way for new endpoints if the internal pruning as part of update_tree is not sufficient.

update_trust_index—updates the trust index at a specified leaf node in the tree. This is used for application trust index feedback.

The present invention maintains the tree-based data structure for individual source level and at aggregated level statistics maintenance. The statistics are maintained based on a key that uniquely identifies an endpoint (referred to hereinafter as "key"). The present invention does not put any constraint on the key; it only expects the key to be sequence of bits uniquely identifying the endpoint for source limiting. The present invention scans the key from left to right and traverses the corresponding path of the tree and modifies the statistics. The number of bits from the key that needs to be looked at (will be referred as BITS_VIEW) a time is configurable.

For tree traversal from any node to its child node specified numbers of bits (called BITS_VIEW above) from the key is looked at such that $2^{BITS\_VIEW}$=MAX_NO_CHILD. For fast lookup to the specified child an array of child pointers of size MAX_NO_CHILD are maintained for one to one mapping. For example: When BITS_VIEW=2 then MAX_NO_CHILD=$^2$ =4 then:

For bits 00 child [0] will be traversed;

For bits 01 child [1] will be traversed;

For bits 10 child [2] will be traversed; and

For bits 11 child [3] will be traversed.

So the tree depth will never be more than MAX_KEY_LENGTH*8/BITS_VIEW.

For memory and performance optimizations three parameters (pattern_length, pattern and mask) are stored at each node to make the depth even lesser wherever possible. When a node which has pattern_length>0 is traversed then the subsequent key bits will be compared against the pattern stored there. If it matches then the next child is determined by moving the bit position in the key by pattern_length and looking at BITS_VIEW bits in the key. Each byte of Key is compared by: if ((pattern[i]& mask[i])^key[i]==0) then there is a match.

Figure 3:
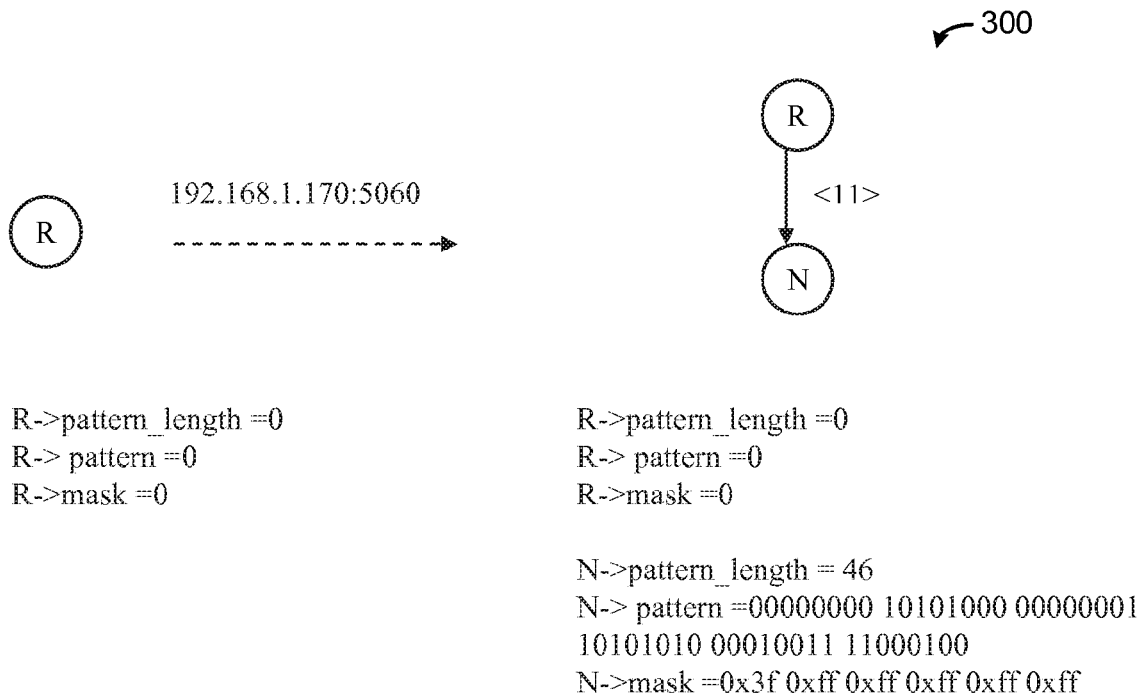
FIG. 3 is a diagram illustrating the addition of a source (endpoint) node within a tree-based data structure in accordance with one embodiment of the present invention.

For example, FIG. 3 is a diagram 300 illustrating the addition of a source (endpoint) node (N) within a tree-based data structure in accordance with one embodiment of the present invention. The new endpoint has an IP address of 192.168.1.170:5060. Here BITS_VIEW=2 and the Key=192.168.1.170:5060=11000000 10101000 00000001 10101010 00010011 11000100. A new node N is added into the empty tree with only a dummy root node R. Since the first 2 bits are <11> so R->child [3] is assigned with N. The remaining key pattern (000000 10101000 00000001 10101010 00010011 11000100) is copied to the pattern of N.

Please note that first two bits <11> of the key are used to traverse from R to N. Before the addition, R->pattern_length=0, R->pattern=0, and R->mask=0. After the addition, R->pattern_length=0, R->pattern=0, R->mask=0, N->pattern_length =46, N->pattern=00000000 1101000 00000001 10101010 00010011 11000100, and N->mask=0x3f 0xff 0xff 0xff 0xff 0xff.

The node N is initialized with the following data:
N->packet_count=1;
N->act_agr_count=1;
N->outs_agr_count=0;
N->drop_flag=0;
N->drop_count=0;
N->refresh_flag=0;
N->traffic_rate=0;
N->trust_index=1; and
N->child_node=0.

And root node R is modified with:
R->packet_count=1;
R->act_agr_count=1; and
R->outs_agr_count=1.

At each node while traversing threshold for that node is dynamically calculated and compared against the packet_count and the decision is made whether to set the return verdict as DROP and return or continue with the traversal. Threshold at each node is calculated as per the following formula:

threshold=(R"*(node->trust_index)*node->act_agr_count−node->traffic_rate)*δ+R"*(node->trust_index)*node->act_agr_count+(MAX_KEY_LENGTH*8−d)*node->act_agr_count.

Here R" is the effective rate per endpoint and d is the bit position in the key after traversing this node (bit position at this node+pattern length of this node). This extra offset is required to maintain that resource exhaustion is detected from bottom up. Here 1<=d<=MAX_KEY_LENGTH*8. For leaf node d=MAX_KEY_LENGTH*8. The node traffic rate is calculated by the following formula and this is also per snapshot period T as R". It is calculated as part of node refreshment after each snapshot.

node->traffic_rate=(node->packet_count)*α+(1−α)*node->traffic_rate.

If node->traffic_rate calculated above is <min_no_packet*node->act_agr_count then node->traffic_rate is set to min_no_packet*node->act_agr_count. Otherwise if node->traffic_rate calculated above is >max_no_packet*node->act_agr_count then node->traffic_rate is set to max_no_packet*node->act_agr_count.

Figure 4:
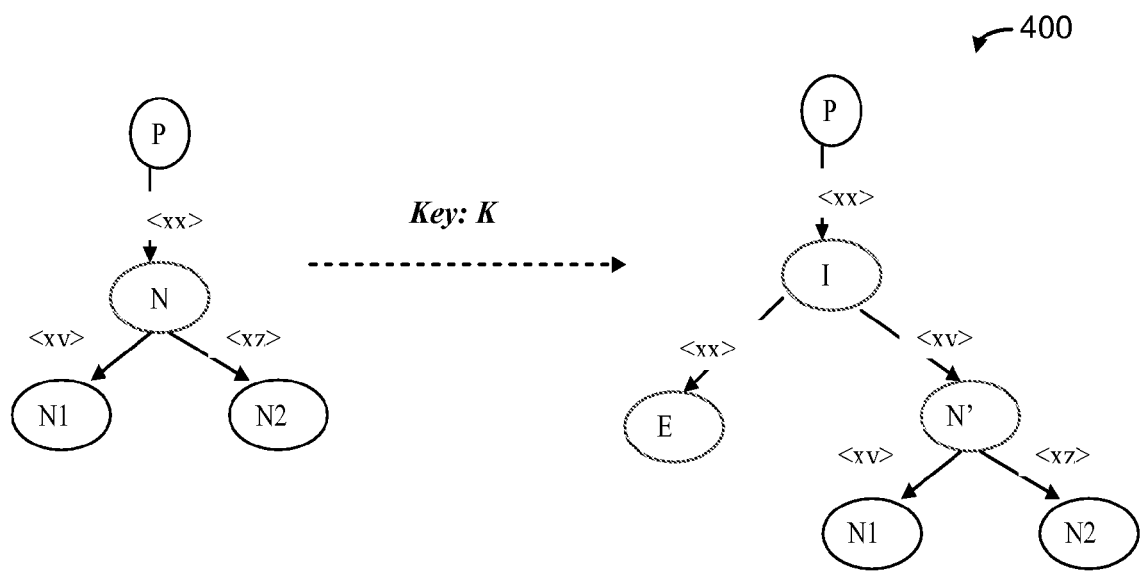
FIG. 4 is a diagram illustrating the addition of an intermediate node and a source (endpoint) node within a tree-based data structure in accordance with one embodiment of the present invention.

Now referring to FIG. 4, a diagram 400 illustrating the addition of an intermediate node (I) and a source (endpoint) node (E) within a tree-based data structure in accordance with one embodiment of the present invention is shown. At any point of time there are not more than 2*N+1 nodes in the tree for N leaves (endpoints) in the tree. This is proved below with the example below in both of the scenarios. When the node is broken due to pattern mismatch two nodes will be added into the tree one leaf node and one intermediate node.

The left hand side represents the tree part before the new endpoint E represented by Key K has been added. Currently node N is getting traversed. In this case the pattern stored at N is not matching the Key pattern and hence the node N is broken. The right hand side shows a leaf node E has been added corresponding to Key K, and the node N has been broken into two intermediate nodes I and N'. The pattern at N did contain <xy> in between and at that location K has <xx> and hence there is a mismatch. The right hand side shows two nodes E and N' being created which is traversed with <xx> and <xy> bits respectively. The common pattern between key K and node N is stored at node I.

For node N:
Ln: Length of the Pattern at node N
Pn: Pattern stored at node N
Mn: Mask stored at node N The remaining pattern of Key at node N is Pk then if ((Pn & Mn)^Pk)!=0). Then there is pattern mismatch at node N and it is broken into two nodes I and N' and a new leaf node E is added as above to represent the new endpoint.

For node I:
Li: Length of the Pattern at node I
Pi: Pattern stored at node I
Mi: Mask stored at node I For node N':
Ln': Length of the Pattern at node N'
Pn': Pattern stored at node N'
Mn': Mask stored at node N'

For node E:
Le: Length of the Pattern at node E
Pe: Pattern stored at node E
Me: Mask stored at node E Then the node N is broken in such a way that I and N' together constitute the node N. The following conditions are satisfied for these nodes:
Li+BITS_VIEW+Ln'=Ln
Pi+c<xy>+c Pn'=Pn (here symbol +c denotes bit concatenation)
Mi+c <11>+c Mn'=Mn For node E:
Pe+c <xx>+c Pi=Pk
Le=length of the remaining key pattern after removing Pi and <xx>
Me=all one's starting after the <xx> position of the key At node N' has all the other values exactly identical to the node N.

Figure 5:
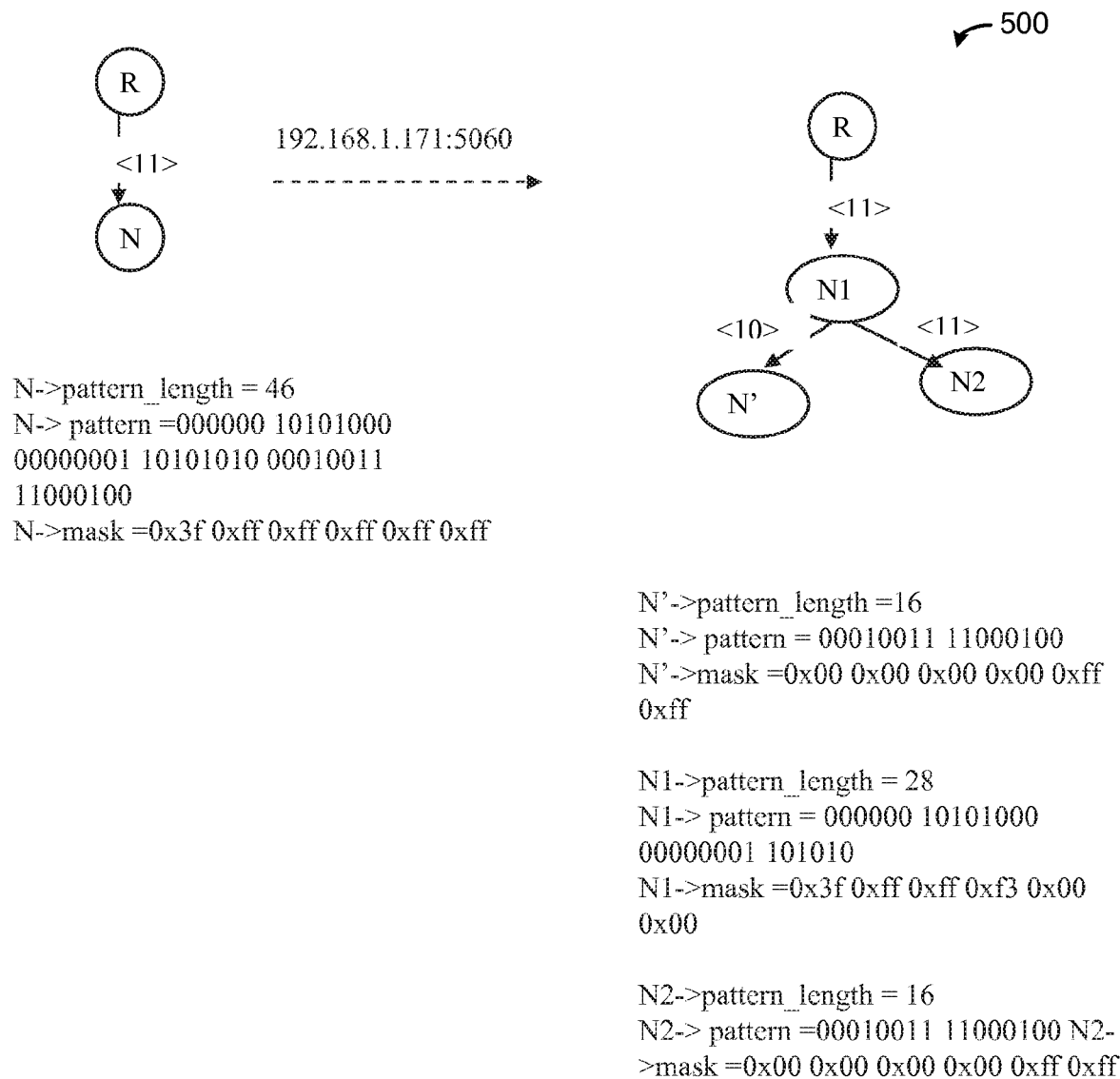
FIG. 5 is a diagram illustrating the addition of an intermediate node and a source (endpoint) node within a tree-based data structure in accordance with one embodiment of the present invention.

For node I following statistics is stored:
I-> packet_count=N->packet_count+1;
I-> act_agr_count=N->act_agr_count+1;
I-> outs_agr_count=N->outs_agr_count+1;

All other values on node N are directly copied to node I
Node E is initialized with
E-> packet_count=1;
E-> act_agr_count=1;
E-> outs_agr_count=0;
E-> drop_flag=0;
E-> drop_count=0;
E-> refresh_flag=0;
E-> traffic_rate=0;
E-> trust_index=1;
E-> child_node=0;

Referring now to FIG. 5, a diagram 500 illustrating the addition of an intermediate node N1 and a source (endpoint) node N' within a tree-based data structure in accordance with one embodiment of the present invention is shown. In the tree of FIG. 4, if a packet from 192.168.1.171:5060 arrives, there will be pattern mismatch between Key and node N at 30th bit. Here Key K=192.168.1.171:5060=11000000 10101000 00000001 10101011 00010011 11000100.

Before the addition, N->pattern_length=46, N->pattern=000000 10101000 00000001 10101010 00010011 11000100, and N->mask=0x3f 0xff 0xff 0xff 0xff 0xff. After the addition, N'->pattern_length=16, N'->pattern=00010011 11000100, N'->mask=0x00 0x00 0x00 0x00 0x00 0xff 0xff, N1->pattern_length=28, N1->pattern=000000 10101000

00000001 101010, N1->mask=0x3f 0xff 0xff 0xf3 0x00 0x00, N2->pattern_length=16, N2->pattern=00010011 11000100, and N2->mask=0x00 0x00 0x00 0x00 0xff 0xff. The other parameters are modified as above.

Figure 6A:
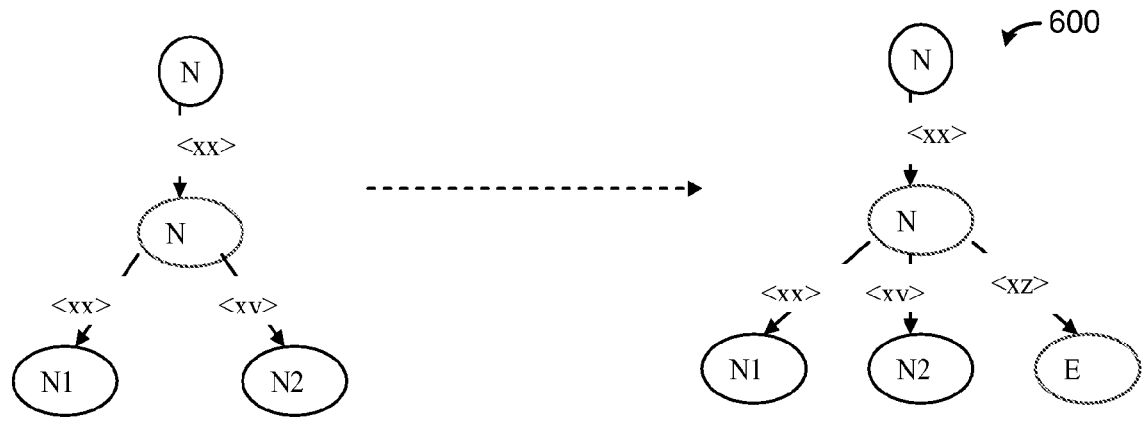
FIGS. 6A and 6B are diagrams illustrating the addition of a source (endpoint) node within a tree-based data structure in accordance with one embodiment of the present invention.
Figure 6B:
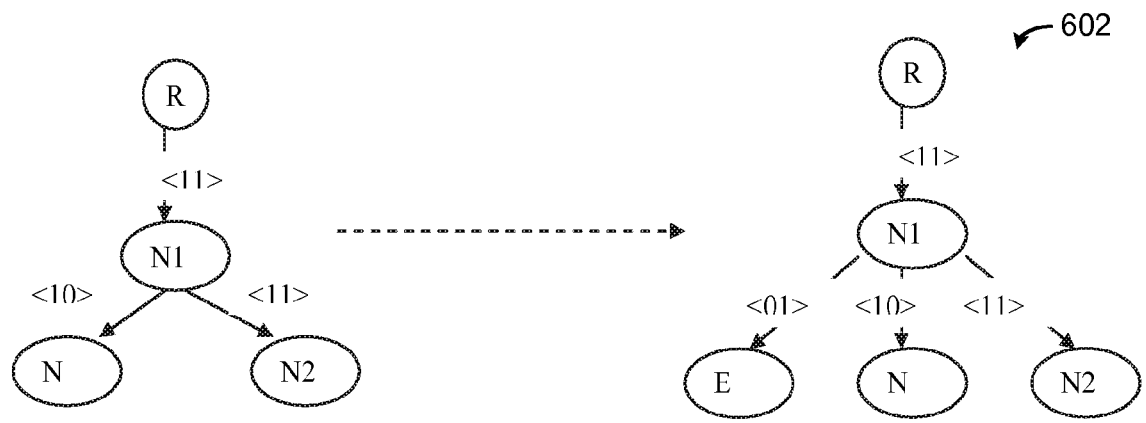

Now referring to FIGS. 6A and 6B, diagram 600 and 602 illustrate the addition of a source (endpoint) node E within a tree-based data structure in accordance with one embodiment of the present invention is shown. When the node is missing one leaf node will be added into the tree. The left hand side represents the tree part before the new endpoint represented by Key K has been added. Currently node N is getting traversed. In this case the pattern stored at N is matching the Key pattern and hence the node N. The right hand side shows a leaf node E has been added corresponding to bit pattern <xz> that did not exist earlier.

As in the above case here also for node E:
Pe+c<xz>+c Pn=Pk
Le=length of the remaining key pattern after removing Pn and <xx>
Me=all one's starting after the <xz> position of the key
For node N, the following statistics are stored:
N->packet_count=N->packet_count+1;
N->act_agr_count=N->act_agr_count+1; and
N->outs_agr_count=N->outs_agr_count+1.
Node E is initialized with:
E->packet_count=1;
E->act_agr_count=1;
E->outs_agr_count=0;
E->drop_flag=0;
E->drop_count=0;
E->refresh_flag=0;
E->traffic_rate=0;
E->trust_index=1;
E->child_node=0;
If a packet from 192.168.1.169:5060 arrive, the node corresponding to <01> at 30th bit will be missing. Here:
Key K=192.168.1.169:5060=11000000 10101000 00000001 10101001 00010011 11000100
E->pattern_length=16.
E->pattern=00010011 11000100
E->mask=0x00 0x00 0x00 0x00 0xff 0xff
Other values are modified as above.

Figure 7:
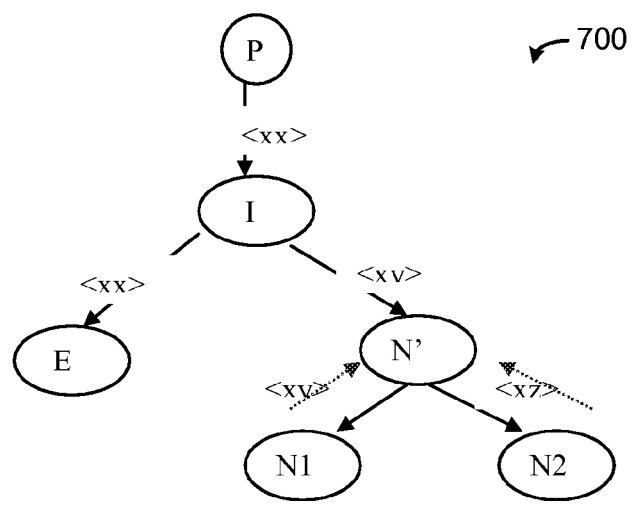
FIG. 7 is a diagram illustrating information pull up within a tree-based data structure in accordance with one embodiment of the present invention.

Referring now to FIG. 7, a diagram 700 illustrating information pull up within a tree-based data structure in accordance with one embodiment of the present invention is shown. The tree is managed in such a way that any node is able to pull all the information about its descendants from its immediate child. N' is the intermediate (non-leaf node) where the threshold is crossed and it needs to pull the following parameters from its child N1 and N2. Lines 702 and 704 denote information getting pulled from child nodes. The following information is pulled from child nodes:
N'->act_agr_count+=N1->outs_agr_count+N2->outs_agr_count;
N'->outs_agr_count+=N1->outs_agr_count+N2->outs_agr_count; and
N'->drop_count+=N1->drop_count+N2->drop_count.
After that values at Childs are reset:
N1->packet_count-=N1->drop_count;
N2->packet_count-=N2->drop_count;
N1->drop_count=N2->drop_count=0; and
N1->outs_agr_count=N2->outs_agr_count=0.
Even after pulling the information from its child nodes if N' has crossed its threshold then N->drop_flag will be made TRUE for that snapshot and the N->trust_index will be halved (self feedback).

The threshold at any intermediate node is crossed if and only if all its descendants has crossed its threshold. If the threshold at N' is crossed even after pulling the information then N'->drop_flag will be made TRUE for that snapshot and the packets will start getting dropped at the aggregated level at node N' only without traversing its descendants.

Since after pulling the info N'->act_agr_count=N1->act_agr_count+N2->act_agr_count and N'->traffic_rate=N1->traffic_rate+N2->traffic_rate (since all the packets traversing N1 or N2 has to go through N'), the threshold at N' is Tn' and at N1 and N2 to be Tn1 and Tn2 respectively. The bit position d in the key after traversing node N' is dn' and for N1 and N2 its dn1 and dn2 respectively. As a result:

$$Tn'-(Tn1+Tn2)=(dn'* \text{node->act\_agr\_count}-dn1* N1\text{->act\_agr\_count}-dn2*N2\text{->act\_agr\_count})$$

Since dn1 <dn' and dn2 <dn' so Tn' −(Tn1+Tn2)>0 and hence Tn' >(Tn1+Tn2).

Thus for any node its threshold is always greater than the sum of thresholds of its child. This in turn is greater than sum of its own Childs. Hence the threshold of any intermediate node is greater than the sum of thresholds of its descendants.

The present invention self modifies the trust index of any node to a lesser value (trust index is divided by some constant) when it detects that threshold is getting crossed at this node. The trust_index of the node gets decremented and hence its threshold is calculated as previously described. When the trust index becomes very small then the threshold becomes zero and that endpoint is eventually blocked. In addition, the present invention lets the application modify the trust index of any node and treats it as if it has itself modified the trust index. This gives flexibility to embed Layer-7 intelligence to Source Limiter algorithm even though Source Limiter is sitting at lower layer.

Now referring to FIG. 8, a flow chart of a method 800 of protecting a network or device in accordance with another embodiment of the present invention is shown. A packet is received in block 802 and a source of the received packet is determined in block 804. The next level node within a tree-based data structure corresponding to the source of the received packet is located in block 806. If a node is not found, as determined in decision block 808, one or more nodes are created in the tree-based data structure corresponding to the source of the received packet in block 810 and the packet is accepted in block 812. If, however, the node is found, as determined in decision block 808, and one or more statistics exceed a threshold value(s), as determined in decision block 814, the statistics are updated in block 816 and the packet is dropped in block 818. If, however, the one or more statistics do not exceed the threshold value(s), as determined in decision block 814, the statistics are updated in block 820. If the located node is an endpoint corresponding to the source of the received packet, as determined in decision block 822, the packet is accepted in block 812. If, however, the located node is not the endpoint corresponding to the source of the received packet, as determined in decision block 822, the process loops back to locate the next level node in the tree-based data structure corresponding to the source of the received packet in block 806 and continues as previously described. The method 800 can be implemented in hardware, software or a combination thereof. The software will implement the steps as one or more code segments of a computer program embodied on a computer readable medium.

Referring now to FIG. 9, a flow chart of a method 900 of protecting a network or device in accordance with another embodiment of the present invention is shown. A packet is received in block 902 and a source of the received packet is determined in block 904. The next level node within a tree-based data structure corresponding to the source of the received packet is located in block 906. If a node is not found, as determined in decision block 908, one or more nodes are created in the tree-based data structure corresponding to the source of the received packet in block 910 and the global statistics are updated in block 912. If the global statistics do not exceed the global threshold values, as determined in decision block 914, the packet is accepted in block 916. If, however, the global statistics exceed the global threshold values, as determined in decision block 914, the packet is dropped in block 918. If, however, the node is found, as determined in decision block 908, and a drop flag for the located node is set, as determined in decision block 920, the global and located node statistics are updated in block 922 and the packet is dropped in block 924.

If, however, the drop flag for the located node is not set, as determined in decision block 920, the threshold value(s) for the located node are calculated in block 926. If the located node statistics exceed a threshold value(s) for the located node, as determined in decision block 928, the global and located node statistics are updated in block 922 and the packet is dropped in block 924. If, however, the located node statistics do not exceed the threshold value(s), as determined in decision block 928, the located node statistics are updated in block 930. If the located node is an endpoint corresponding to the source of the received packet, as determined in decision block 932, the global statistics are updated in block 912. If the global statistics do not exceed the global threshold values, as determined in decision block 914, the packet is accepted in block 916. If, however, the global statistics exceed the global threshold values, as determined in decision block 914, the packet is dropped in block 918. If, however, the located node is not the endpoint corresponding to the source of the received packet, as determined in decision block 932, the process loops back to locate the next level node in the tree-based data structure corresponding to the source of the received packet in block 906 and continues as previously described. The method 900 can be implemented in hardware, software or a combination thereof The software will implement the steps as one or more code segments of a computer program embodied on a computer readable medium.

Figure 10A:
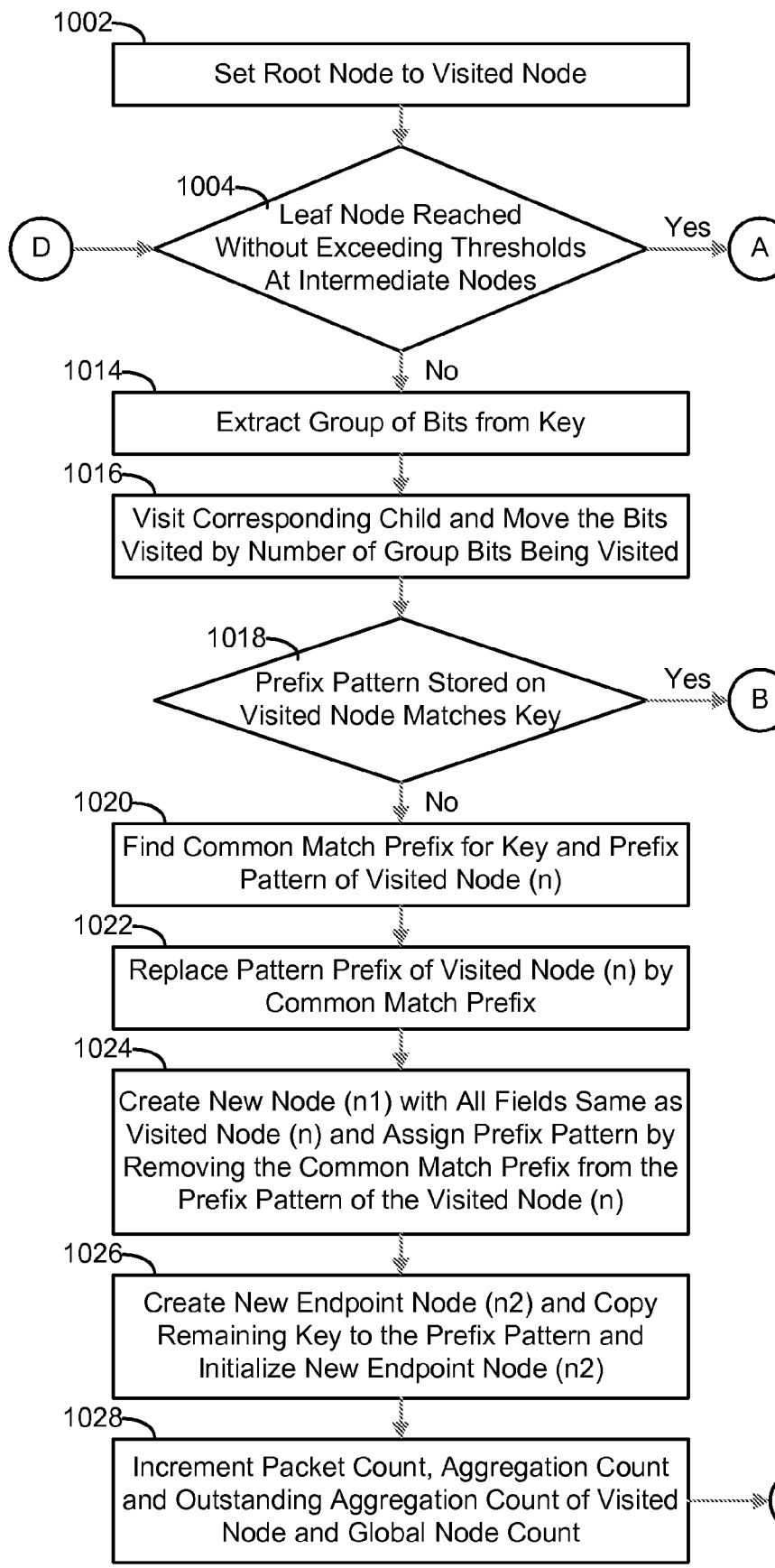
FIGS. 10A, 10B and 10C are flow charts of a method of protecting a network or device in accordance with another embodiment of the present invention.
Figure 10B:
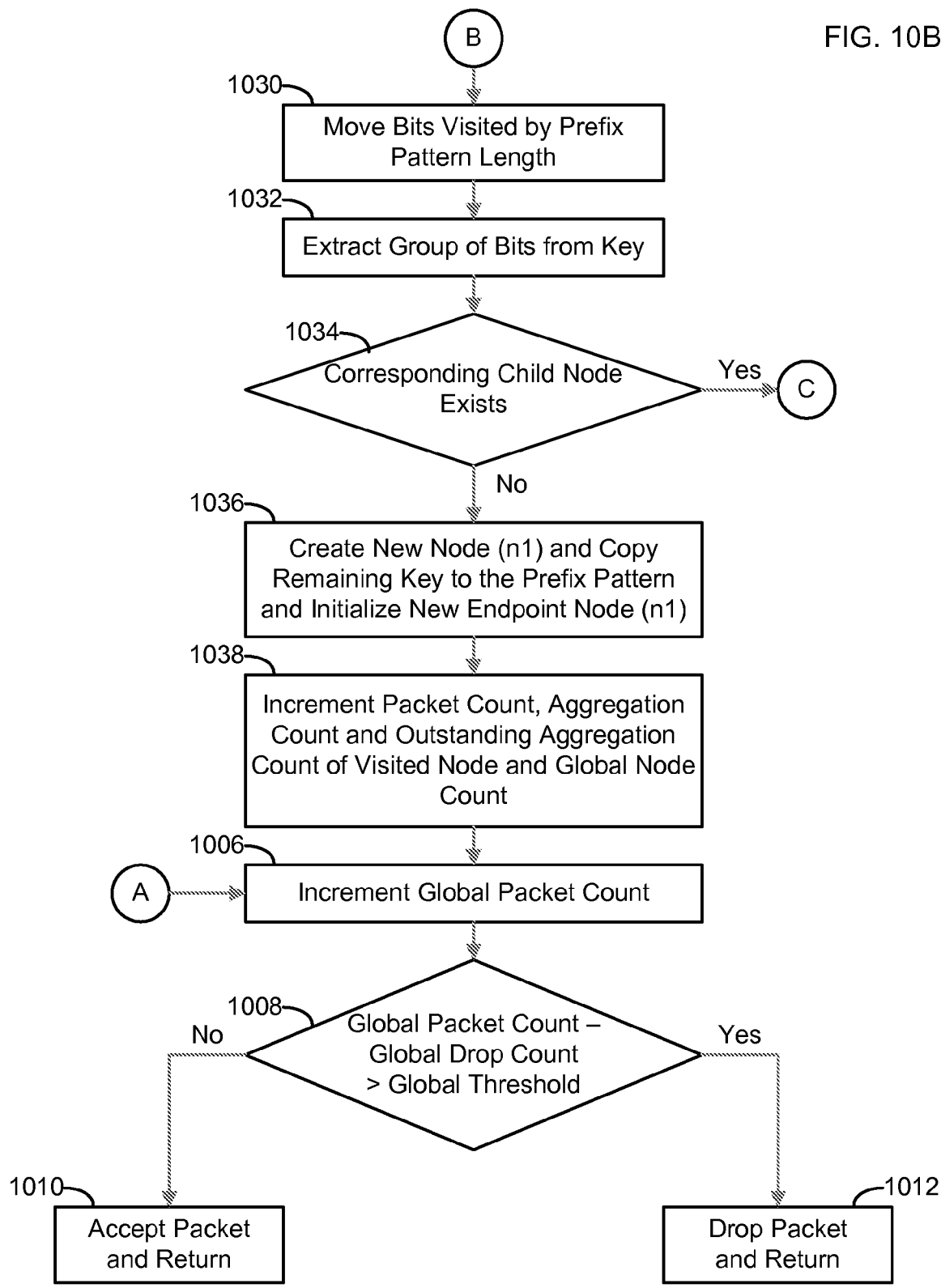
Figure 10C:
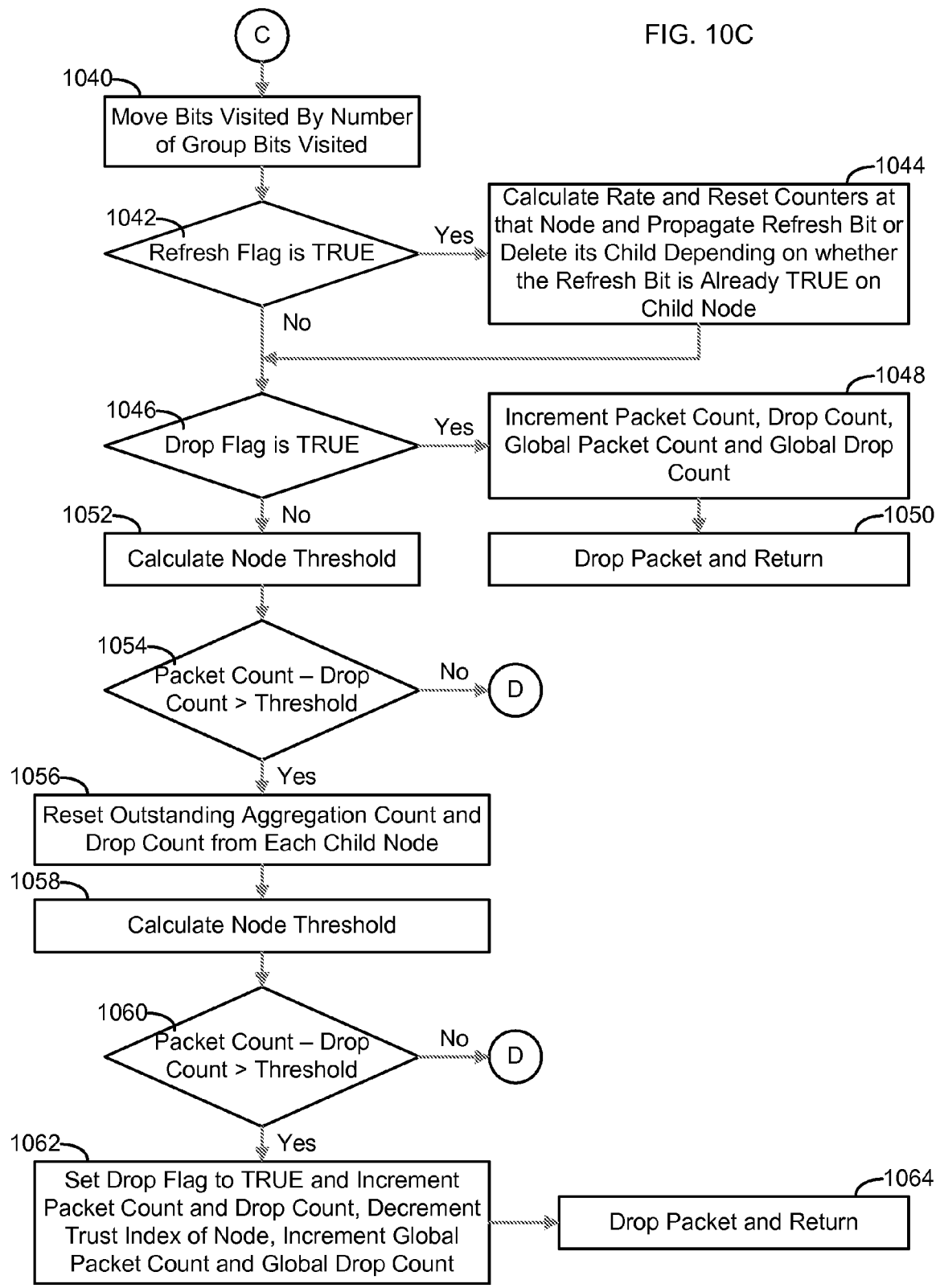

Now referring to FIGS. 10A, 10B and 10C, flow charts of a method 1000 of protecting a network or device in accordance with another embodiment of the present invention are shown. The algorithm used has the following characteristics:

INPUTS:
    Key: The Key based on which source limiting is done
    Root: Source Limiter root node
OUTPUTS:
    Return verdict for DROP or ACCEPT
DATA STRUCTURES:
    At each node following data structure is being maintained

```
struct node_data{
    UCHAR    pattern_length;
    UCHAR    pattern[MAX_KEY_LENGTH];
    UCHAR    mask[MAX_KEY_LENGTH];
    UCHAR    drop_flag;
    UINT     drop_count;
    UCHAR    refresh_flag;
    INT      act_agr_count;
    INT      outs_agr_count;
    UINT     packet_count;
    UINT     traffic_rate;
    UINT     trust_index;
} node_data;
```

EXTERNAL INPUTS:
    Source Limiter requires a recurring external timer be maintained with timeout value equal to SNAPSHOT PERIOD and at each expiry it should set the refresh_flag at root node to TRUE.
    One more global timer is required for rate limiting and global rate and global threshold calculation. The timeout for this timer should be much smaller than SNAPSHOT PERIOD.
GLOBAL INPUTS:
    The previously described global parameters are used:
        global packet count
        global drop count
        global node count
        global threshold
ALGORITHMIC STEPS
Step 0: Make the Root node as the node being visited (block 1002).
Step 1: If the leaf node is reached without any thresholds are being crossed at intermediate nodes (block 1004) then goto step 13 for rate limiting (blocks 1006-1012).
Step 2: Extract the group of bits from the key (block 1014) and visit the corresponding child and move the bits visited by number of group bits being visited (block 1016).
Step 3: See if the prefix pattern stored on the node being visited matches the one in the key (block 1018). If it matches then move the bits visited by prefix pattern length (1030) and go to step 5 (blocks 1032-1034) else /*its packet from a new endpoint*/proceed to Step 4 (blocks 1020-1028).
Step 4: Do the following at this step:
    a. Find the common match prefix for key and prefix pattern of the node being visited (say n) (block 1020).
    b. Replace the prefix pattern of the current node (n) being visited by common match prefix (block 1022).
    c. Create a new node (n1) with all the fields same as current node being visited and assign prefix pattern to the one by removing the common match prefix from the prefix pattern of the node being visited (block 1024).
    d. Create another node (n2) to represent the new endpoint and copy the remaining key (the postfix bits not visited yet excluding the common match prefix) to the prefix pattern of this node. And initialize this node (block 1026).
    5. Increment the packet count, aggregation count and outstanding aggregation count of the current node by one. Increment the global node count by one (block 1028) and goto step 13 for rate limiting (block 1006-1012).
Step 5: Extract the group of bits from the key (block 1032) and see whether the corresponding child node exists (block 1034). If it exists then move the bits visited by number of group bits being visited (block 1040) and go to step 7 (blocks 1042-1044) otherwise continue to step 6 /* its packet from a new endpoint*/(blocks 1036-1038).
Step 6: Do the following at this step:
    a. Create a node (n1) to represent the new endpoint and copy the remaining key (the postfix bits not visited yet) to the prefix pattern of this node. And initialize this node (block 1036).

b. Increment the packet count, aggregation count and outstanding aggregation count of the current node. Increment the global node count by one (block 1038) and goto step 13 for rate limiting (1006-1012).

Step 7: If the refresh flag is TRUE (block 1042) then calculate the rate and reset the counters at that node and propagate the refresh bit or delete its child depending on whether the refresh bit is already TRUE on the child node /*self managing*/ (block 1044).

Step 8: If the drop flag is TRUE (block 1046) then increment the packet count, drop count, global packet count and global drop count (block 1048). Drop the packet and return (block 1050).

Step 9: Calculate the node threshold (block 1052) and see whether the (packet count-drop count) is greater than threshold (block 1054). If it is greater than threshold then continue to Step 10 (block 1056) else go to step 1 (block 1004).

Step 10: Pull the outstanding aggregation count and drop count from each of its Childs and reset the outstanding aggregation count and drop count at each of its Childs (block 1056).

Step 11: Re-calculate the node threshold (block 1058) and see whether the (packet count-drop count) is still greater than threshold (block 1060). If it is greater than threshold then continue to Step 12 (blocks 1062-1064) else go to step 1 (block 1004).

Step 12: Set the drop flag to TRUE, increment the packet count and drop count, decrement the trust index of this node/*self feedback*/, and increment the global packet count and global drop count (block 1062). Drop the packet and return (block 1064).

Step 13: Increment the global packet count (block 1006) and see whether the (global packet count-global drop count) is greater than global threshold (block 1008). If it is greater than threshold then drop the packet and return (block 1012). Accept the packet and return otherwise (block 1010).

The algorithm described above can be implemented in Hardware having a bit matching engine so that the mask field is not required at each node. The bit patterns can be matched directly without considering the byte boundary. Another enhancement to this algorithm can be maintaining a list of trusted endpoints (White list) dynamically with application feedback, and during high volume DDOS bandwidth can be reserved for these trusted endpoints.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for protecting against high volume attacks using an apparatus comprising a processor communicably coupled to a memory, the method comprising the steps of:

receiving a packet at the apparatus;

determining a source of the received packet using the processor;

creating a pattern key that uniquely identifies the source of the received packet;

updating a tree-based data structure within the memory based on the pattern key using the processor, wherein the tree-based data structure comprises a set of root, intermediate and leaf nodes linked together based on the pattern key such that two or more statistics are maintained for each node and the two or more statistics comprise an actual aggregation count of how many sources of the received packets are represented by the corresponding node and a packet count of how many of the received packets have traversed the corresponding node;

accepting the received packet whenever none of the statistics stored within the tree-based data structure for each node between the root node and the node corresponding to the source of the received packet exceed a threshold using the processor, wherein the threshold comprises:

a maximum effective traffic rate per endpoint determined by $(R*T)/\Sigma \lambda i$ where i=1 to n, R is an allowed traffic rate, T is a time period and $\lambda i$ is a trust index of ith endpoint;

a global threshold determined by $(R-r)*\delta+R$ where R is the allowed traffic rate r is a cumulative traffic rate and $\delta$ is a maximum delay that can be introduced for the communications packet; and a node threshold determined by $(R''*(node\text{->}trust\_index)*node\text{->}act\_agr\_count-node\text{->}trafficJate)*\delta + R''*(node\text{->}trust\ index)*node\text{->}act\_agr\_count + (MAX\_KEY\ LENGTH*8-d)*node\text{->}act\_agr\_count$ where R" is an effective rate per endpoint, and d is a bit position in a key after traversing the node;

or a combination thereof; and dropping the received packet whenever one or more of the statistics stored within the tree-based data structure for any node between the root node and the node corresponding to the source of the received packet exceed the threshold using the processor.

2. The method as recited in claim 1, wherein the updating step executed by the processor further comprises one or more of the steps of:

updating the one or more statistics;

determining the threshold;

determining a new traffic rate at the node and resetting one or more counters;

creating one or more new nodes within the tree-based data structure corresponding to the source of the received packet;

deleting one or more existing nodes within the tree-based data structure after a specified time period with no activity;
automatically adjusting the threshold based on a packet volume; or
reserving a bandwidth for one or more trusted sources.

3. The method as recited in claim 1, wherein the processor performs the steps at a link speed or substantially at the link speed or near the link speed.

4. The method as recited in claim 1, wherein the pattern key is derived from an Internet Protocol address of the source of the received packet.

5. The method as recited in claim 1, wherein each node within the tree-based data structure comprises:
a common pattern length;
a length of the common pattern;
a common pattern;
a common pattern that this node represents;
a common pattern mask;
a drop flag;
a refresh flag;
the actual aggregation count;
an outstanding aggregation count;
the packet count;
a drop count;
a node traffic rate; and
a node trust index.

6. The method as recited in claim 1, further comprising the step of obtaining all information about a node's descendants from an immediate child of the node within the tree-based data structure.

7. The method as recited in claim 1, wherein a threshold for each node within the tree-based data structure is always greater that a sum of the threshold for all descendants of the node.

8. The method as recited in claim 1, wherein the apparatus further comprises a bit matching engine communicably coupled to the processor that does not require a mask field at each node within the tree-based data structure.

9. The method as recited in claim 1, wherein the one or more statistics comprise one or more global statistics, one or more node statistics, a traffic rate, a maximum delay, a maximum number of sources in a time period, a minimum number of allowed messages from a source within the time period, a maximum number or allowed messages from the source within the time period, an endpoint count, a cumulative packet count, a cumulative traffic rate, a trust index, a drop flag, or a combination thereof.

10. The method as recited in claim 1, wherein a node within the tree-based data structure is defined by:
struct node_data {
　UCHAR pattern_length;
　UCHAR pattern[MAX_KEY_LENGTH];
　UCHAR mask [MAX KEY LENGTH]; - - -
　UCHAR drop_$_{flag}$;
　UINT drop_count;
　UCHAR refresh_flag;
　INT act_agr_count;
　INT outs_agr_count;
　UINT packet_count;
　UINT trafficJate;
　UINT trust_index;
　struct node *child node[MAX NO CHILD]; - - -
} node_data;
wherein MAX_KEY_LENGTH is a length of a key in number of bytes; and
wherein MAX NO CHILD IS a maXImum number of children any node can have.

11. A computer program embodied on a non-transitory computer readable medium for protecting against high volume attacks comprising:
a code segment for receiving a packet;
a code segment for determining a source of the received packet;
a code segment for creating a pattern key that uniquely identifies the source of the received packet;
a code segment for updating a tree-based data structure based on the pattern key, wherein the tree-based data structure comprises a set of root, intermediate and leaf nodes linked together based on the pattern key such that two or more statistics are maintained for each node and the two or more statistics comprise an actual aggregation count of how many sources of the received packets are represented by the corresponding node and a packet count of how many of the received packets have traversed the corresponding node;
a code segment for accepting the received packet whenever none of the statistics stored within the tree-based data structure for each node between the root node and the node corresponding to the source of the received packet exceed a threshold, wherein the threshold comprises:
a maximum effective traffic rate per endpoint determined by $(R*T)/\Sigma\lambda i$ where i=1 to n, R is an allowed traffic rate, T is a time period and $\lambda i$ is a trust index of ith endpoint;
a global threshold determined by $(R-r)*\delta+R$ where R is the allowed traffic rate, r is a cumulative traffic rate and $\delta$ is a maximum delay that can be introduced for the communications packet; and
a node threshold determined by (R"*(node->trust_index)*node->act_agr_count−node->trafficJate)*δ+ R"*(node->trust_index)*node->act_agr_count+ (MAX KEY LENGTH*8−d)*node->act agr count where R" is an effective rate per endpoint, and d is a bit position in a key after traversing the node; or a combination thereof; and
a code segment for dropping the received packet whenever one or more of the statistics stored within the tree-based data structure for any node between the root node and the node corresponding to the source of the received packet exceed the threshold.

12. The computer program as recited in claim 11, wherein the updating code segment further comprises:
a code segment for updating the one or more statistics;
a code segment for determining the threshold;
a code segment for determining a new traffic rate at the node and resetting one or more counters;
a code segment for creating one or more new nodes within the tree-based data structure corresponding to the source of the received packet;
a code segment for deleting one or more existing nodes within the tree-based data structure after a specified time period with no activity;
a code segment for automatically adjusting the threshold based on a packet volume; or
a code segment for reserving a bandwidth for one or more trusted sources.

13. The computer program as recited in claim 11, wherein the code segments are performed at a link speed or substantially at the link speed or near the link speed.

14. The computer program as recited in claim 11, wherein the pattern key is derived from an Internet Protocol address of the source of the received packet.

15. The computer program as recited in claim 11, wherein the one or more statistics comprise one or more global statistics, one or more node statistics, a traffic rate, a maximum delay, a maximum number of sources in a time period, a minimum number of allowed messages from a source within the time period, a maximum number or allowed messages from the source within the time period, an endpoint count, a cumulative packet count, a cumulative traffic rate, a trust index, a drop flag, or a combination thereof.

16. An apparatus for protecting against high volume attacks comprising:
   first and second communications interfaces; and
   a processor communicably coupled to the first and second communications interfaces wherein the processor: (a) determines a source of a packet received at the first communications interface, (b) creates a pattern key that uniquely identifies the source of the received packet, (c) updates a tree-based data structure based on the pattern key, wherein the tree-based data structure comprises a set of root, intermediate and leaf nodes linked together based on the pattern key such that two or more statistics are maintained for each node and the two or more statistics comprise an actual aggregation count of how many sources of the received packets are represented by the corresponding node and a packet count of how many of the received packets have traversed the corresponding node, (d) passes the received packet to the second communications interface whenever none of the statistics stored within the tree-based data structure for each node between the root node and the node corresponding to the source of the received packet exceed a threshold, wherein the threshold comprises: a maximum effective traffic rate per endpoint determined by $(R*T)/\Sigma\lambda i$ where i=1 to n, R is an allowed traffic rate, T is a time period and $\lambda i$ is a trust index of ith endpoint, a global threshold determined by $(R-r)*\delta+R$ where R is the allowed traffic rate, r is a cumulative traffic rate and $\delta$ is a maximum delay that can be introduced for the communications packet, and a node threshold determined by (R"*(node->trust_index)*node->act_agr_count−node->traffic-Jate)*$\delta$+R"*(node->trust_index)*node->act_agr_count+(MAX KEY LENGTH*8−d)*node->act agr count where R" is an effective rate per endpoint, and d is a bit position in a key after traversing the node; or a combination thereof, and (e) drops the received packet whenever one or more of the statistics stored within the tree-based data structure for any node between the root node and the node corresponding to the source of the received packet exceed the threshold.

17. The apparatus as recited in claim 16, wherein the tree-based data structure updates further comprise:
   pdating the one or more statistics;
   determining the threshold;
   determining a new traffic rate at the node and resetting one or more counters;
   creating one or more new nodes within the tree-based data structure corresponding to the source of the received packet;
   deleting one or more existing nodes within the tree-based data structure after a specified time period with no activity;
   automatically adjusting the threshold based on a packet volume; or
   reserving a bandwidth for one or more trusted sources.

18. The apparatus as recited in claim 16, wherein the received packets are processed at a link speed or substantially at the link speed or near the link speed.

19. The apparatus as recited in claim 16, wherein the pattern key is derived from an Internet Protocol address of the source of the received packet.

20. The apparatus as recited in claim 16, wherein the one or more statistics comprise one or more global statistics, one or more node statistics, a traffic rate, a maximum delay, a maximum number of sources in a time period, a minimum number of allowed messages from a source within the time period, a maximum number or allowed messages from the source within the time period, an endpoint count, a cumulative packet count, a cumulative traffic rate, a trust index, a drop flag, or a combination thereof.

21. A system for protecting against high volume attacks comprising:
   a first network;
   a first communications interface communicably coupled to the first network;
   a second network or destination device;
   a second communication interface communicably coupled to the second network; and
   a processor communicably coupled to the first and second communications interfaces wherein the processor: (a) determines a source of a packet received at the first communications interface, (b) creates a pattern key that uniquely identifies the source of the received packet, (c) updates a tree-based data structure based on the pattern key, wherein the tree-based data structure comprises a set of root, intermediate and leaf nodes linked together based on the pattern key such that two or more statistics are maintained for each node and the two or more statistics comprise an actual aggregation count of how many sources of the received packets are represented by the corresponding node and a packet count of how many of sources of the received packets have traversed the corresponding node, (d) passes the received packet to the second communications interface whenever none of the statistics stored within the tree-based data structure for each node between the root node and the node corresponding to the source of the received packet exceed a threshold , wherein the threshold comprises: a maximum effective traffic rate per endpoint determined by $(R*T)/\Sigma\lambda i$ where i=1 to n, R is an allowed traffic rate, T is a time period and $\lambda i$ is a trust index of ith endpoint, a global threshold determined by $(R-r)*\delta+R$ where R is the allowed traffic rate, r is a cumulative traffic rate and $\delta$ is a maximum delay that can be introduced for the communications packet, and a node threshold determined by (R"*(node->trust_index)*node->act_agr$_{13}$ count−node->trafficJate)*$\delta$+R"*(node->trust_index) *node->act_agr_count +(MAX_KEY_LENGTH*8−d) *node->act_agr_count where R" is an effective rate per endpoint, and d is a bit position in a key after traversing the node; or a combination thereof, and (e) drops the received packet whenever one or more of the statistics stored within the tree-based data structure for any node between the root node and the node corresponding to the source of the received packet exceed the threshold.

22. The system as recited in claim 21, wherein the tree-based data structure updates further comprise:
   updating the one or more statistics;
   determining the threshold;
   determining a new traffic rate at the node and resetting one or more counters;
   creating one or more new nodes within the tree-based data structure corresponding to the source of the received packet;

deleting one or more existing nodes within the tree-based data structure after a specified time period with no activity;
automatically adjusting the threshold based on a packet volume; or
reserving a bandwidth for one or more trusted sources.

23. The system as recited in claim 21, wherein the received packets are processed at a link speed or substantially at the link speed or near the link speed.

24. The system as recited in claim 21, wherein the pattern key is derived from an Internet Protocol address of the source of the received packet.

25. The system as recited in claim 21, wherein the one or more statistics are maintained for an individual source and at an aggregated level.

26. The system as recited in claim 21, wherein the one or more statistics comprise one or more global statistics, one or more node statistics, a traffic rate, a maximum delay, a maximum number of sources in a time period, a minimum number of allowed messages from a source within the time period, a maximum number or allowed messages from the source within the time period, an endpoint count, a cumulative packet count, a cumulative traffic rate, a trust index, a drop flag, or a combination thereof.

* * * * *

UNITED STATES PATENT AND TRADEMARK OFFICE
CERTIFICATE OF CORRECTION

PATENT NO. : 8,707,419 B2
APPLICATION NO. : 11/769609
DATED : April 22, 2014
INVENTOR(S) : Srikrishna Kurapati et al.

It is certified that error appears in the above-identified patent and that said Letters Patent is hereby corrected as shown below:

In the Claims:

Column 15, please replace line 54 with:
--UCHAR mask [MAX_KEY_LENGTH];--

Column 15, please replace line 63 with:
--struct node *child node[MAX_NO_CHILD];--

Column 16, please replace line 1 with:
--wherein MAX_NO_CHILD IS a maximum number of--

Signed and Sealed this
Fourteenth Day of October, 2014

Michelle K. Lee
*Deputy Director of the United States Patent and Trademark Office*